Oct. 3, 1939.  B. A. LINDERMAN  2,174,635
FLUID ACTUATED DEVICE
Filed Oct. 22, 1934  3 Sheets-Sheet 1

INVENTOR:
BERT A. LINDERMAN
BY
Cox + Moore ATT'YS.

Oct. 3, 1939. B. A. LINDERMAN 2,174,635
FLUID ACTUATED DEVICE
Filed Oct. 22, 1934 3 Sheets-Sheet 2
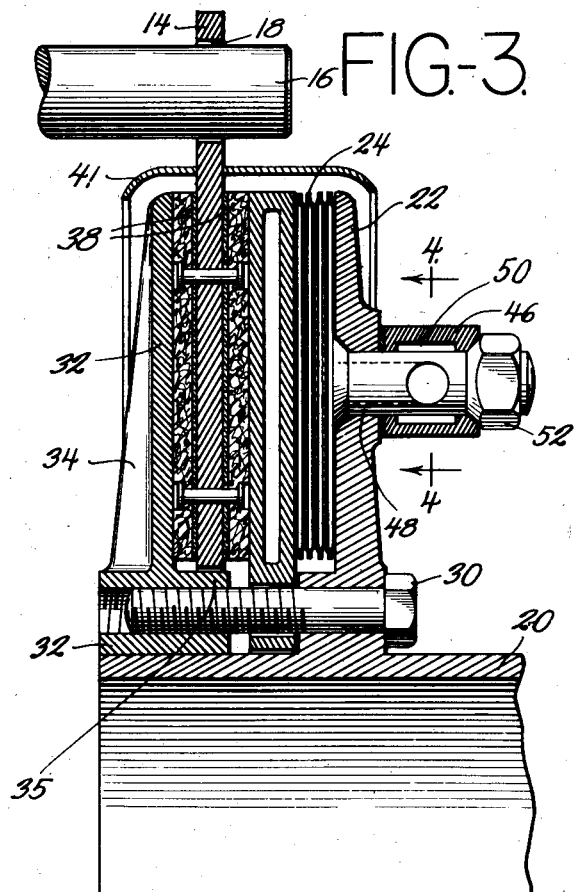
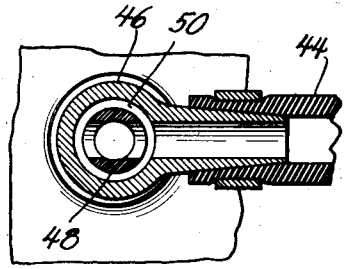
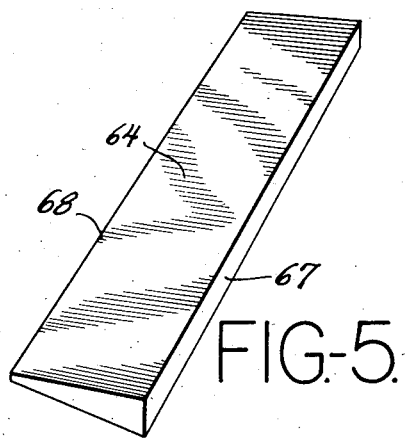
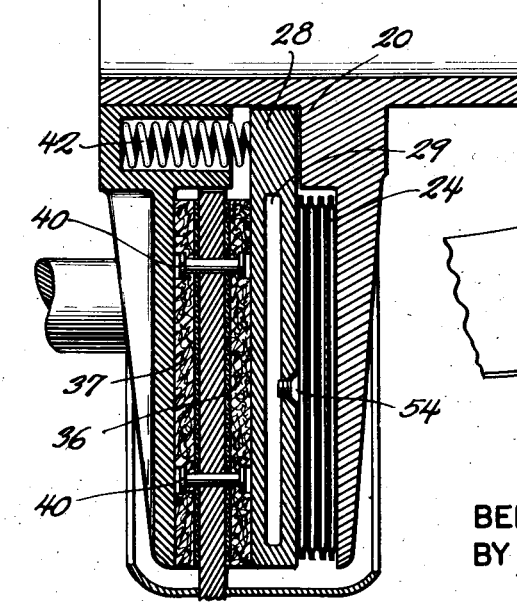
INVENTOR:
BERT A. LINDERMAN
BY *Cox & Moore* ATT'YS.

Oct. 3, 1939.  B. A. LINDERMAN  2,174,635
FLUID ACTUATED DEVICE
Filed Oct. 22, 1934  3 Sheets-Sheet 3
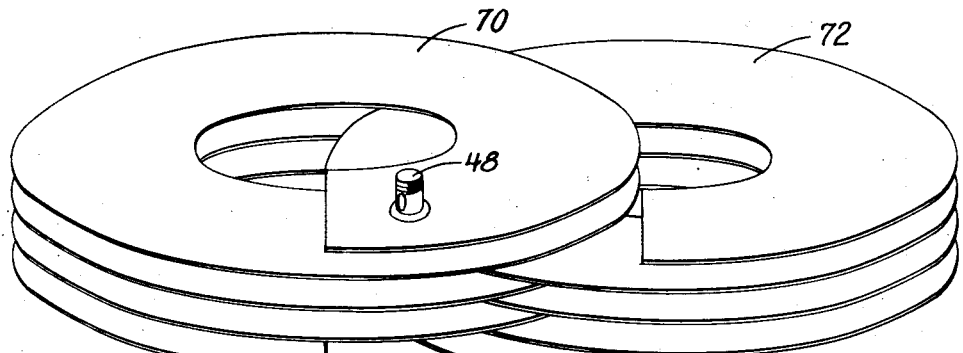
FIG.-7.
FIG.-8.
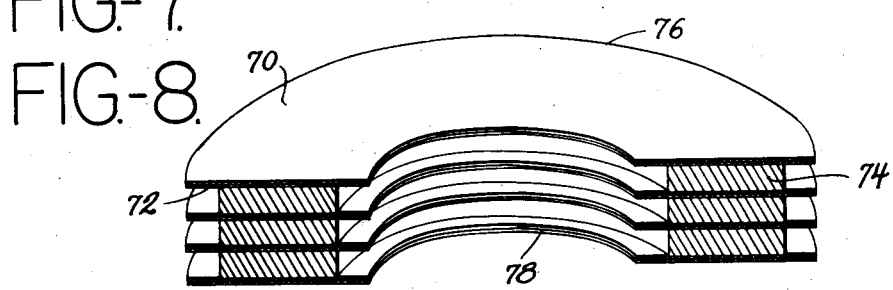
FIG.-9.
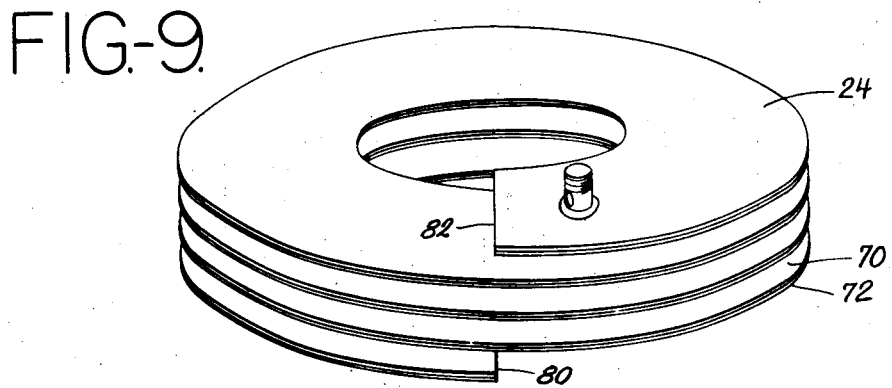
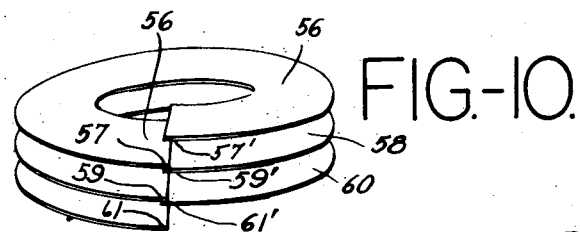
FIG.-10.
INVENTOR:
BERT A. LINDERMAN
BY
Cox & Moore ATT'YS.

Patented Oct. 3, 1939

2,174,635

UNITED STATES PATENT OFFICE 2,174,635

FLUID ACTUATED DEVICE

Bert A. Linderman, Detroit, Mich.; D. Jean Louise Linderman, administratrix, c. t. a., of said Bert A. Linderman, deceased, assignor to Linderman Devices, Inc., Newburgh, N. Y., a corporation of Delaware Application October 22, 1934, Serial No. 749,382

19 Claims. (Cl. 188—72)

This invention relates to fluid actuated devices and more particularly to fluid actuated brake or clutch mechanisms. It is particularly adapted for use with the wheels of an automotive vehicle, but is of general utility and may be applied to control the rotating parts of various machines.

It is an object of the invention to provide a new and improved fluid actuated device which may be readily and cheaply constructed, but which is durable and wholly efficient in operation.

It is a further object of the invention to provide a fluid actuated diaphragm device in which rotating friction pieces may be bodily displaced longitudinally of their axis of rotation by fluid pressure to engage a stationary brake plate member.

It is a further object of the invention to provide a fluid actuated diaphragm device constructed of a minimum of parts, all of which may be readily assembled, and which are readily accessible for repair or replacement.

It is a further object of the invention to provide a brake or clutch mechanism which is readily adaptable to various types of rotating machine parts.

It is a further object of the invention to provide a brake or clutch construction in which friction surfaces are relatively large in proportion to the size of the construction, thus reducing the unit pressures which need be utilized.

It is a further object of the invention to provide in a friction brake or clutch construction, means for cooling certain parts by air circulation and for cooling other parts by liquid circulation.

It is a further object to provide in such a construction insulating means for protecting certain parts of the construction from damage by generated heat.

It is a further object to provide a new and improved helically arranged diaphragm for use in a fluid pressure operated device.

It is another object of the invention to provide a new diaphragm and improved methods for constructing the same. By one method helical diaphragm plates are rolled from a single piece of bar stock.

Other objects and advantages of the invention will be apparent from the following description taken in connection with the drawings, wherein there is particularly set forth certain preferred arrangements.

Referring to the drawings wherein like parts are denoted by like reference numerals throughout:

Fig. 3 is a sectional view on the line 3—3 of Fig. 2, certain parts being omitted for clarity, and the diaphragm being slightly expanded.

Fig. 4 is a detail section of the connection for fixing the fluid conduit to the diaphragm taken on the line 4—4 of Fig. 3.

Fig. 5 is a perspective view of the bar stock from which the diaphragm plate may be formed, according to one method.

Fig. 6 is a perspective view showing the step of rolling the bar of Fig. 5.

Figs. 7 and 8 are views showing the various steps for forming the helical diaphragm, Fig. 7 being a perspective and Fig. 8 a section.

Fig. 9 shows the completed diaphragm.

Fig. 10 is a perspective view showing a second method for forming the diaphragm plate.

Figure 1:
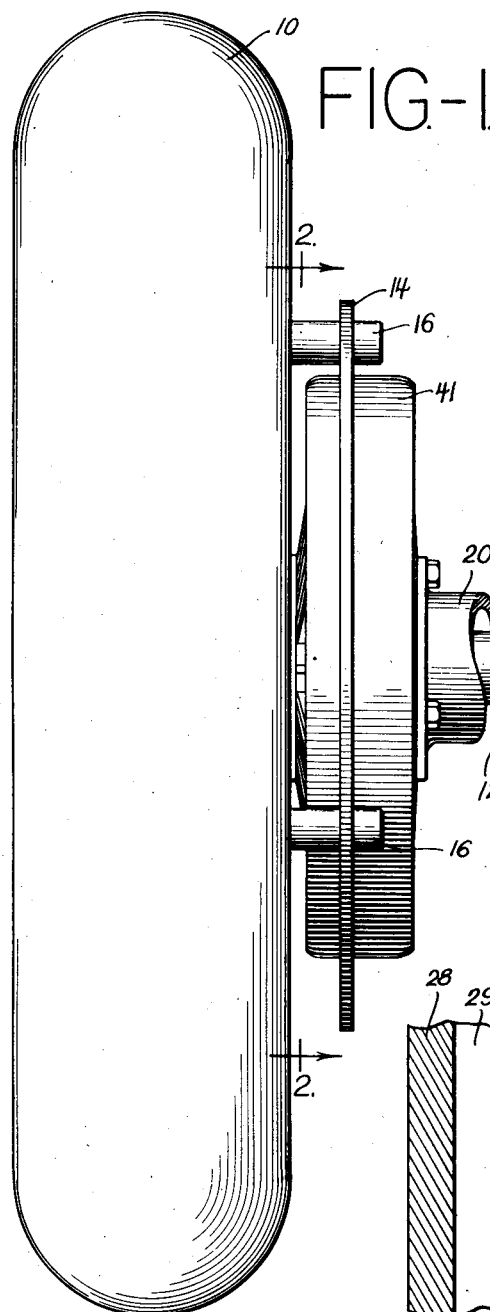
Fig. 1 is a side elevation view of the invention as it would be applied to the wheel of an automotive vehicle.

In Fig. 1 the invention is shown as a brake applied to the wheel of an automotive vehicle. My new and improved mechanism, however, is not limited to such use. The fluid pressure operated diaphragm may be used to control or operate various devices. It is particularly adapted for use with a brake or clutch mechanism as shown. The brake or clutch assembly is in turn particularly adapted for use with the wheels of an automotive vehicle but may be used as well to brake or clutch the rotating parts of my machine which are to be controlled.

As shown in the drawings for purposes of illustration, a vehicle wheel 10, driven by the rotatable axle 12 is arranged to drive the rotating friction disc 14 of the brake mechanism by means of lugs 16, rigidly fastened to the wheel and extending loosely through holes 18 in the brake disc. The device could be applied to any rotating machine part as a brake or clutch therefor by merely substituting such part for the wheel 10. In the drawings, three lugs equally spaced around the wheel are shown, but any convenient number of lugs might be used.

Figure 2:
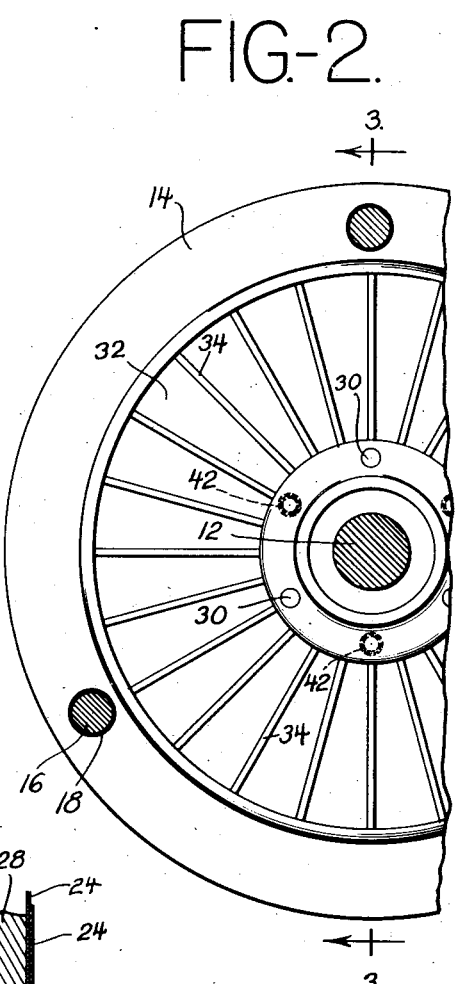
Fig. 2 is a sectional view along the line 2—2 of Fig. 1, showing more particularly the air-cooling fins on the brake mechanism.

The stationary axle housing 20 of the vehicle, within which the rotating axle 12 is journalled, has integrally formed therewith a radially extending flange 22 to which is secured a helically formed fluid-tight metal diaphragm 24. One face of the diaphragm bears against the flange 22 and the other face bears against a plate 28 carried upon the stationary axle 20. The plate 28 is arranged to slide longitudinally along the axis of the axle to the left, as shown in Fig. 3, as the diaphragm is expanded by actuation from fluid pressure, but the plate is prevented from rotation with respect to the axle by means of studs 30, carried by the axle flange 22, which loosely pass through circular openings in the plate. The circular openings are slightly larger than the bolt bodies and the plate fits loosely upon axle 20, which permits longitudinal displacement of the plate and constitutes a floating mounting, but rotation of the plate with respect to the stationary axle is prevented. As shown in Fig. 2, three equally spaced bolts 30 are provided, but it is obvious that any convenient number may be utilized. The plate 28 has formed therein an annular channel 29 in fluid communication with the interior of the diaphragm 24 by means of the connection 54.

A heat insulation piece of suitable heat insulating material might be secured to the face of plate 28 against which the diaphragm engages to insulate the diaphragm, if desired.

Snugly fitted upon the axle 20 at its end adjacent the wheel 10 is a plate member 32. This plate member snugly embraces the axle 20 and is further held immovable both rotatably and longitudinally with respect to the axle by the bolts 30, which threadedly engage openings formed in the axially extending bearing portion 35 of the plate 32. Radially arranged air-cooling fins 34 are arranged on plate 32, as shown more particularly in Figs. 2 and 3.

The rotatable friction disc 14 is loosely or floatingly journalled upon an axially extending portion 35 of plate member 32. The disc 14 has secured upon its opposite faces a friction piece 36, which is arranged to bear against plate 28, and a friction piece 37, which is arranged to bear against plate 32, as shown in Fig. 3. The friction pieces may be formed of any usual brake lining material. Arranged between the lining pieces and the disc 14 are insulation members 38 of any suitable heat insulating material. The lining pieces and the heat insulating pieces are fixed to the disc 14 by the usual lining rivets 40. Disc 14 carries a circumferential band member 41, forming a suitable enclosure for the entire brake assembly.

Arranged within pockets formed within the part 35 of plate 32 are compression springs 42 which bear at one end against the plate 32 and at the other end against plate 28. As best shown in Fig. 2, three such compression springs may be conveniently provided, arranged in alternate relation with respect to bolts 30 circumferentially of the stationary axle 20.

The fluid conduit 44, Fig. 4, is connected with some suitable fluid pressure actuator which in an automotive installation would be operated by the brake pedal of the vehicle. The fluid is introduced from the conduit 44 into the diaphragm 24 for the purpose of expanding the same to apply the brakes. One or more connections between conduit 44 and the diaphragm may be provided. One suitable form of connecting member is shown in Figs. 3 and 4. As shown, a generally circular member 46 which has an extending nipple to which the conduit 44 is secured, embraces a projection 48 secured to the face of the diaphragm 24. The projection 48 may be secured to the diaphragm by welding its enlarged flanged end to the diaphragm plate adjacent a hole in the plate through which the projection extends. The projection member 48 has a hollow bore in communication with the interior of the diaphragm, and this bore extends from the inner end of the member adjacent the diaphragm to its mid-portion, where it passes radially through said member and into communication with an annular chamber 50, formed between parts 46 and 48. The chamber 50 communicates with the bore in the extension of member 46 to which the conduit 44 is fastened. A nut 52, threaded to the end of projection 48, holds connection piece 46 in position. Suitable fluid-tight washers are interposed between the nut 52 and the connection piece 46, and between the connection piece 46 and flange 22, as shown in Fig. 3, to prevent fluid escape.

Figure 11:
Fig. 11 is a sectional detail of the fluid connection shown in Fig. 3 by which diaphragm fluid may be transmitted from the diaphragm to a cooling chamber.

One suitable form of connection by which fluid may be introduced from the diaphragm 24 to annular cooling chamber 29 in the plate member 28, is best shown in Figs. 3 and 11. As shown, a connecting piece 54 having a hollow bore has its enlarged head portion fixedly secured, as by welding, to the face plate of the diaphragm 24, through which it extends. The connecting piece threadedly engages an opening formed in the plate 28 and a suitable gasket 55 is arranged between the diaphragm and plate 28 to prevent fluid escape, as shown. The hollow bore within the connecting piece 54 communicates with the interior of the diaphragm and with the cooling chamber 29.

The diaphragm 24 and the methods of making it are best shown in Figs. 5, 6, 7, 8, 9 and 10. As shown in Fig. 9, the completed diaphragm comprises a helically arranged elongated fluid-tight chamber, formed by securing the peripheral edges of two mating helical plates 70 and 72. The helical plates shown individually in Fig. 7 can be constructed in various ways.

One method of formation is shown in Fig. 10. According to this method a series of similar annular ring-like flat metal plate members 56, 58 and 60 are cut with corresponding radial slits, as shown. The plates are then bent into helical form and the portion 57 adjacent the slit in plate 56 is secured, as by welding, to the portion 59' adjacent the slit in plate 58. The portion 59 of plate 58 is similarly secured to part 61' of plate 60. A helically formed continuous plate member, such as shown in Fig. 7, is thereby formed; and this helical or spiral plate member may be made of any desired length by increasing the number of original plates from which it is formed.

Another method of forming the diaphragm plates of Fig. 7 is shown more particularly in Figs. 5 and 6. According to this method a single straight elongated metal bar 64 of wedge shaped cross section (Fig. 5) is used to form one of the diaphragm plates, the bar being formed into helical formation merely by rolling it through a series of passes between parallelly arranged rollers 66, in the manner shown in Fig. 6. As shown in Fig. 5, the thick edge 67 of the original bar is considerably thicker than the thin edge 68. As the bar is rolled between parallel rolls 66 only the edge 67 will be engaged at first, and as the rolling progresses by the repeated passes between the rollers, more and more of the bar being engaged, the originally straight bar will take on a circular shape, as shown in Fig. 6, due to the squeezing out of the metal along edge 67, longitudinally of the bar. The rolling is continued until edge 67 is reduced in thickness to the thickness of thin edge 68. At this time the bar will have taken on a definite circular shape and, if of sufficient length to form more than one complete turn, will be in helical arrangement, as shown in Fig. 7. The curvature of the completed article with respect to its size can be determined by varying the original ratio between the thickness of thick edge 67 and thin edge 68. For example, if edge 67 is originally 2½ times as thick as edge 68, an original bar 64, 3 inches wide, could theoretically be formed into a diaphragm plate of uniform thickness having an external diameter of 10 inches and internal bore portion of 4 inches diameter, the external circumference of the plate thus being 2½ times as great as the bore circumference. In practice, however, to produce this diaphragm, it would be necessary to vary the ratio between edges 67 and 68 from 2½ to 1 to some greater ratio, possibly 3 to 1, due to the fact that all of the material along the thickened edge will not be extended longitudinally of the bar, but some of it will be squeezed out laterally or radially of the completed diaphragm. The increase of ratio necessary with any given size of the diaphragm or kind of metal can be determined in each case by slight experimentation.

The rolling method of forming the helical diaphragm plates has various advantages. It is extremely economical and simple, and each diaphragm plate is readily formed but from a single bar of stock by a simple rolling operation. No welding in the formation of the plates is required.

After the diaphragm plates are formed into helical or spiral arrangement two of them, as indicated at 70 and 72 in Fig. 7, are interfitted in the manner there shown, the fluid connection members 48 and 54 having been previously secured in position upon the individual plates. After interfitting the two spiral plate pieces are arranged upon a similarly spiralled welding platform 74, as shown in Fig. 8. As will be seen in Fig. 8, the diaphragm plates are wider than the welding platform so that they overhang the edges of the platform. The outer and inner peripheral portions 76 and 78 of the diaphragm plates are then welded. The mating ends 80 and 82 are also welded, thus forming on removal from platform 74, the completed spiralled diaphragm, as shown in Fig. 9, having a fluid-tight spiralled chamber therein.

After the completed diaphragm is formed, the fluid connection piece 54 is threaded into the plate 28 by rotating the completed diaphragm to which the connection is secured with respect to the plate 28. Compressible washer 55 will yield sufficiently to allow the alignment of the diaphragm with plate member 28 in the position these parts must occupy in the completed brake assembly. Diaphragm 24 and plate 28 may then be assembled in the device as a unit.

The operation of my improved brake mechanism is as follows: Normally the diaphragm 24 is held in collapsed position by reason of the engagement of compression springs 42 against plate member 28, the compression springs tending to separate plate 28 and fixed plate 34. With the parts in this position there is no substantial pressure between the brake lining 36 and plate member 28, or between the brake lining 37 and plate member 32, the disc 14 being thus permitted to rotate freely under actuation from the vehicle wheel member 10. As the brake pedal of the vehicle is operated, fluid under pressure is introduced through conduit 44 and connection piece 48, into the spiral chamber of diaphragm 24. The diaphragm bearing against fixed flange 22 is thus expanded, forcing plate 28 bodily to the left, as indicated in Fig. 3, and axially of the assembly into engagement with its co-operating friction piece 36, bodily displacement of plate 28 being permitted by the sliding of the plate along bolts 30 and along axle housing 20. As plate 28 engages its corresponding friction piece 36 the disc 14 is also displaced axially and bodily to the left as viewed in Fig. 3, until friction piece 37 engages fixed plate member 32. Bodily displacement of disc 14 is permitted by reason of its slidable connection with driving pins 16 and by reason of its loose mounting upon portion 35 of plate 32. Engagement between rotatable friction pieces 36 and 37 and non-rotatable plates 28 and 32 produces a frictional drag or braking action upon disc 14 and through pins 16 stops the vehicle wheel 10. Upon release of the fluid pressure the springs 42 return the parts to initial position.

The floating mounting of plate 28 and disc 14 permits automatic adjustment of the parts to compensate for irregularities in the engaging surfaces and for wear. After extended use, wear of the linings may also be compensated for by drawing up on bolts 30 to bring plate 32 to the right, as seen in Fig. 3.

The heat generated by the braking action is dissipated from plate 32 by the air-cooled radial fins 34 and from plate 28 by the diaphragm fluid, which acts as a cooling medium within the annular chamber 29. Disc 14 is protected from excess heat and warping which might be caused thereby, by the heat insulation members 38. The diaphragm 24 may also be heat insulated from plate 28, if desired, by the heat insulation piece which may be secured to the plate.

It will thus be seen that a fluid brake construction of the axially displaceable type has been produced, which may be readily and cheaply constructed, which is adaptable to various types of machines, and which is wholly durable and efficient in operation. It will be seen that the friction and diaphragm faces through which the braking action is applied, are of a large area relative to the size of the device, thus reducing wear and the diaphragm pressures which must be utilized. The diaphragm plates, according to the rolling method of construction, are of single pieces which renders the diaphragm highly durable, and it may be very readily and cheaply constructed. The brake mechanism throughout is constructed of a minimum of parts which may be readily assembled, but which are wholly accessible for repair. The brake mechanism automatically compensates for irregularities in and wear of the friction surfaces by reason of the fact that both plate 28 and disc 14 are floatingly mounted for movement toward fixed member 32. Further, due to the floating mounting of disc 14 and plate 28, an even and efficient braking action is secured over the entire surface of the friction pieces regardless of irregularities on the plate or friction piece surfaces, the floating mounting allowing the parts to adjust themselves for such irregularities. The brake is air and fluid cooled, and the parts are protected from generated heat.

It is obvious that various changes may be made in the specific embodiments of my invention, which I have used for illustrative purposes, and I therefore do not wish to be limited to the precise constructions and methods described, but only as indicated in the following claims.

I claim:

1. A friction device of the fluid pressure operated type including a helical diaphragm axially expansible, and an axially movable gripping member operable thereby.

2. A friction device of the fluid pressure actuated type, comprising a helical metallic bellows diaphragm axially expansible.

3. A friction device of the fluid pressure operated type, comprising a helical expansible bellows diaphragm having a pair of substantially parallel end faces, a fixed abutment engaging one of said faces, and a friction applying movable plate engageable with the other of said faces.

4. In a friction device of the fluid pressure operated type, an annular diaphragm having a helical fluid-tight chamber therein.

5. In a friction device of the fluid operated type, an annular metallic diaphragm having a pair of substantially parallel radially arranged faces and a helical fluid-tight chamber therebetween, a fixed abutment engaging one of said faces, a friction applying member engaging the other of said faces, and fluid pressure means for expanding the diaphragm.

6. In an automotive vehicle brake construction of the fluid operated type, a fixed flange member, an axially movable non-rotatable brake applying plate, a helically formed fluid pressure operated diaphragm between said flange and said plate for moving the latter, a rotatable friction disc engageable by said plate, and a second stationary plate engageable by said rotatable friction disc, and a rotatable wheel for rotating said friction disc.

7. In a friction device of the fluid operated type, an annular axially movable non-rotatable friction applying plate, and a helical metallic bellows diaphragm having a relatively wide operating surface engaging said plate for moving it.

8. A friction device comprising an axially movable non-rotatable member floatingly mounted to permit adjustment with respect to its axis, a helical, fluid-operated diaphragm for moving said member axially, means for preventing rotation of said member, a rotatable friction disc axially movable and also floatingly mounted to allow adjustment with respect to its axis of rotation engageable by said non-rotatable member, and a fixed member engageable by said friction disc.

9. A friction device of the fluid pressure operated type, comprising a friction applying member, an expansible diaphragm for operating said member, a fluid cooling chamber within said member, and fluid connections between said diaphragm and said chamber.

10. A diaphragm comprising a pair of interfitted helically formed plate members secured along their cooperating peripheral edges to form a helical fluid-tight chamber.

11. A friction device of the fluid-operated type, comprising a helical, expansible diaphragm, fluid connections to said diaphragm for transmitting fluid thereto for expanding the same, a stationary member, a rotatable member, friction means arranged between the stationary and rotatable members and operated by said diaphragm for stopping said rotatable member, and a heat absorbing means between said diaphragm and said friction means.

12. In the combination of claim 11 wherein said stationary member is provided with air-cooling fins for dissipating the heat generated in said member upon operation of the device.

13. A diaphragm comprising a pair of interfitted helically formed plate members having each a plurality of convolutions and secured along their cooperating peripheral edges to form a helical fluid-tight chamber having substantially parallel end walls.

14. In a friction device, a driven member, a support for said member, a stationary housing adapted to enclose said support, said housing having an annular flange member projecting therefrom, an adjustable plate non-rotatably secured to said annular flange member, an axially movable annular friction member interposed between said annular flange member and said plate, an enclosing cover for said annular flange member, said adjustable plate and said friction member through which the rim of said friction member extends, interengaging means for connecting the rim of said friction member to the driven member, and operating means interposed between said friction member and said annular flange member.

15. In a brake unit for a vehicle wheel having spaced axially extending pins, a stationary housing adapted to enclose the axle of said wheel, said housing having an annular flange member projecting therefrom, an adjustable plate non-rotatably secured to said annular flange member, an axially movable annular brake member interposed between said annular flange member and said plate, said brake member having a plurality of annularly spaced openings adjacent the periphery thereof and adapted to freely receive the axially extending pins carried by the vehicle wheel whereby said brake member is constrained against rotatable movement relative to the wheel but is free for axial movement with respect thereto, and an operating member interposed between said brake member and said annular flange member causing said brake member to engage said plate to stop the wheel.

16. A friction mechanism of the fluid operated type, comprising an expansible diaphragm, fluid connections to said diaphragm for transmitting fluid thereto for operating the same, a friction gripping device operated by said diaphragm, a heat absorbing means between said diaphragm and said gripping device, and fluid connections between said diaphragm and said heat absorbing means.

17. In a brake for the wheel of a vehicle, in combination a fixed housing having an annular flange member, an annular plate non-rotatably secured to said flange member, a second plate non-rotatably secured to the housing but freely movable axially thereof between said flange member and said first mentioned plate, an axially movable annular brake member secured to said wheel and interposed between said first and second plates, an expansible diaphragm interposed between said flange member and said second plate for moving the latter axially of said housing to force the brake member into braking engagement with said first plate, and fluid connections to said diaphragm for transmitting fluid thereto for expanding the same, said second plate being hollow and being provided with a fluid connection to the expansible diaphragm for receiving fluid therefrom for cooling said second plate.

18. A construction as defined in claim 17 wherein the first plate is provided with air cooling fins for dissipating the heat generated in the plate upon the operation of the brake.

19. In a brake for the wheel of a vehicle, in combination a fixed housing having an annular flange member, an annular plate non-rotatably secured to said flange member, a second plate non-rotatably secured to the housing but freely movable axially thereof between said flange member and said first mentioned plate, an axially movable annular brake member secured to said wheel and interposed between said first and second plates, an expansible diaphragm interposed between said flange member and said second plate for moving the latter axially of said housing to force the brake member into braking engagement with said first plate, and fluid connections to said diaphragm for transmitting fluid thereto for expanding the same, said diaphragm comprising a pair of interfitted helically formed plate members secured along their cooperating peripheral edges to form a helical fluid-tight chamber.

BERT A. LINDERMAN.